United States Patent Office 3,428,670
Patented Feb. 18, 1969

3,428,670
HYDRAZOBENZENES AND THEIR PRODUCTION
Ernst Jucker, Ettingen, Adolf J. Lindenmann, Basel, and Fulvio Gadient, Birsfelden, Switzerland, assignors to Sandoz Ltd. (also known as Sandoz A.G.), Basel, Switzerland
No Drawing. Original application Sept. 10, 1963, Ser. No. 307,816, now Patent No. 3,250,782, dated May 10, 1966. Divided and this application Aug. 18, 1965, Ser. No. 493,295
Claims priority, application Switzerland, Jan. 6, 1961, 180/61; Sept. 21, 1961, 10,983/61; Nov. 16, 1961, 13,309/61; Aug. 6, 1962, 9,385/62; Feb. 20, 1963, 2,085/63
U.S. Cl. 260—479       6 Claims
Int. Cl. C07c 69/00; A61k 27/00; C09b 29/12

ABSTRACT OF THE DISCLOSURE

Hydrazobenzenes of the formula:

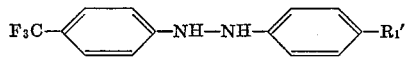

wherein $R_1'$ is hydrogen, halogen, lower alkoxy, lower acyloxy, lower acylamino or trifluoromethyl are useful as antiphlogistics and analgesics for the treatment of rheumatic and other inflammatory processes.

The present invention relates to new pyrazolidine-3,5-dione derivatives, their production and substituted hydrazobenzene intermediates therefor. This application is a divisional application of Ser. No. 307,816, now Patent No. 3,250,782 which is a continuation-in-part of applications Ser. Nos. 271,571 filed Apr. 9, 1963, and 238,011 filed Nov. 15, 1962, now abandoned. Ser. No. 271,571 is a continuation-in-part of Ser. No. 164,407, filed Jan. 4, 1962, now abandoned.

The pyrazolidine-3,5-dione derivatives of the present invention correspond to the formula:

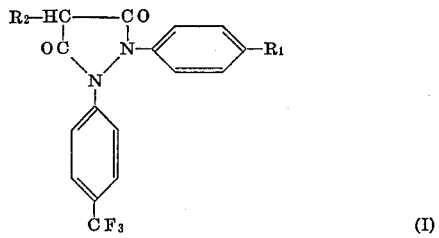

wherein $R_1$ is selected from the group consisting of hydrogen, halogen, lower alkoxy, lower acyloxy, lower acylamino, hydroxyl and trifluoromethyl, and $R_2$ is selected from the group consisting of lower alkyl, cycloalkyl and lower aralkyl.

The aforesaid compounds of the Formula I are prepared according to this invention by condensing, in an inert organic solvent, a compound of the formula:

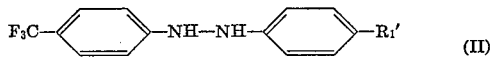

wherein $R_1'$ is a member selected from the group consisting of hydrogen, halogen, lower alkoxy, lower acyloxy, lower acylamino and trifluoromethyl, with a malonic acid dihalide of the formula:

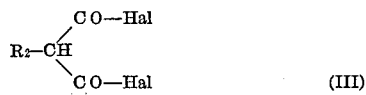

wherein $R_2$ has the above significance, and Hal is a member selected from the group consisting of chlorine and bromine, or a dialkyl ester thereof such as the diethyl ester, and, when $R_1'$ is acyloxy and $R_1$ is to signify hydroxyl, the condensation product is deacylated in manner per se known to deacylate an acyloxy radical to form the corresponding hydroxyl.

The term "known" as used herein designates a method described in the literature on the subject or in actual use.

It should be noted that the reaction of the malonic acid derivative having the Formula III with compound II may take place in the absence of a tertiary base. However, under these conditions the yield is relatively poor so that the use of a tertiary base is preferred.

The process of the invention may, for example, be effected as follows: A solution of a hydrazobenzene derivative, e.g. p-trifluoromethyl-p'-acetoxy-hydrazobenzene, p-trifluoromethyl-p'-halogeno-hydrazobenzene, p-trifluoromethyl-p'-acetylamino-hydrazobenzene, p-trifluoromethyl-p'-methoxy-hydrazobenzene, p,p'-trifluoromethyl hydrazobenzene or p-trifluoromethyl-hydrazobenzene, in an inert organic solvent, e.g. methylene chloride, chloroform or dioxane, is added dropwise to a compound III, e.g. n-butyl-malonic acid dichloride or sec. amyl-malonic acid dichloride, dissolved in the same solvent, at a temperature of −5° C. to +20° C. in the presence of a tertiary base, e.g. pyridine or triethylamine. To complete the reaction the mixture is heated for a further one to five hours or stirred at room temperature for fifteen to twenty hours. The condensation product is isolated from the reaction mixture and then purified in manner known per se. When $R_1$ is to signify hydroxyl, the acyloxy radical is appropriately saponified.

The new compounds of the present invention possess pharmacodynamic properties which make them extremely valuable as medicaments. They develop a specific antiphlogistic and analgesic action which is useful for the treatment of rheumatic and other inflammatory processes. The substances described in this application possess an extremely low toxicity and a complete lack of undesirable side effects. Especially they do not exert any retention of sodium in the body. The new compounds may thus be used as antirheumatic agents. The compounds are also useful as intermediates in the preparation of other useful medicaments.

The starting compounds of the Formula II are themselves new and form part of this invention. Compounds II in which $R_1'$ signifies an alkoxy or acyloxy radical may be produced as follows: p-trifluoromethyl aniline is diazotized in manner known per se at below room temperature and the resulting diazonium salt is coupled with phenol. The hydroxyl radical of the resulting p-trifluoromethyl-p'-hydroxyazobenzene is acylated in accordance with known methods, e.g., with acetic anhydride, or etherified with a dialkyl sulfate, e.g., with dimethyl sulfate or diethyl sulfate before the reduction of the hydrazobenzene derivative.

The reduction of the azo compound to the corresponding hydrazo compound may be effected either with nascent or catalytically activated hydrogen. Lithium aluminum hydride in the presence of a trace of copper or iron chloride, sodium amalgam in aqueous ethanol, zinc dust in pyridine with the addition of glacial acetic acid, zinc/ammonia in ethanol or ammoniacal alcoholic hydrogen sulfide are examples of suitable agents when reducing with nascent hydrogen.

The reduction with catalytically activated hydrogen is preferably effected with palladium as catalyst at room temperature and normal pressure.

Should compounds II, in which $R_1'$ signifies an acylamino radical or hydrogen be desired, then the diazonium salt of p-trifluoromethyl aniline is coupled with anilinomethanesulfonic acid and after splitting off the methanesulfonyl radical, the resulting p-trifluoromethyl-p'-amino-azobenzene is isolated according to known methods and purified. The primary amino group is subsequently either acylated with a suitable acylating agent or substituted by hydrogen. The substitution of the amino radical in the p position by hydrogen is effected as follows: p-trifluoromethyl-p'-amino-azobenzene is diazotized in the normal manner at a temperature below room temperature. Lower aliphatic alcohols or water are examples of suitable solvents. The resulting diazonium salt solution is then stirred for a further one to one and one-half hours at 0° C. and subsequently treated with hypophosphorus acid. To complete the reaction, the reaction mixture is stirred for a further two to five hours at 0° C. to 5° C. After standing for twelve to twenty hours at the same temperature the p-trifluoromethyl-azobenzene separates as a precipitate. It is isolated and purified in accordance with known methods.

Compounds II, in which $R_1'$ signifies a halogen atom, may be obtained by condensing p-trifluoromethyl aniline with a p-nitrosohalogenobenzene in the presence of a suitable solvent, preferably glacial acetic acid, to form p-trifluoromethyl-p'-halogeno-azobenzene.

The resulting azobenzene derivatives, in which $R_1'$ signifies an acylamino radical or a hydrogen or halogen atom, are, as has already been described, reduced to the corresponding hydrazo derivatives.

With $R_1'$ in compounds II is trifluoromethyl, the compound is p,p'-trifluoromethyl-hydrazobenzene which is produced by reducing p-nitro-benzotrifluoride with alcoholic alkali metal hydroxide solution in the presence of a catalyst amount of a hydrogen transferring ketone such as 9-fluorenone, benzanthrone, anthrone, benzophenone or xanthone and reducing the resulting p,p'-trifluoromethyl-azoxybenzene by any suitable method for converting an aromatic azoxy compound to the corresponding hydrazo compound. The last reduction step can, for example, be carried out with nascent hydrogen obtained by the reaction of glacial acetic acid on zinc, or by catalytically activated hydrogen produced with platinum oxide.

In the following non-limitative examples all temperatures are stated in degrees centigrade. The melting and boiling points are uncorrected.

Example 1.—1-(p-trifluoromethyl-phenyl)-2-(p'-hydroxyphenyl)-4-n-butyl-pyrazolidine-3,5-dione A mixture of 4.1 g. of pyridine in 13 cc. of methylene chloride and subsequently a solution of 8.1 g. of p-trifluoromethyl-p'-acetoxy-hydrazobenzene in 26 cc. of methylene chloride are added dropwise at 0° C. to 5° C. to a solution of 5.1 g. of n-butyl-malonic acid dichloride (boiling point 82–84°/12 mm. Hg) in 26 cc. of methylene chloride. The reaction solution is heated to the boil for two hours, then cooled to 0° and then washed with 20 cc. of an ice cold 2 N hydrochloric acid as well as with 30 cc. of water. The solution which has been dried over magnesium sulfate is subsequently concentrated and the crystalline residue heated with 8.7 cc. of a 2 N sodium hydroxide solution for one hour to 50°. After cooling the solution is acidified with cold 5 N hydrochloric acid and shaken three times with 30 cc. of ethyl acetate. The extract is washed with water until neutral, dried over magnesium sulfate and evaporated to dryness in a vacuum. The residue, the 1 - (p - trifluoromethylphenyl) - 2 - (p'-hydroxyphenyl)-4-n-butyl-pyrazolidine-3,5-dione is recrystallized from ether/pentane. Melting point 130–132°. The p-trifluoromethyl-p'-acetoxy-hydrazobenzene used as a starting material is prepared as follows:

(a) p-Trifluoromethyl-p'-hydroxy-azobenzene.—A solution of 30 cc. of concentrated hydrochloric acid in 250 cc. of water is added to 16.1 g. of p-trifluoromethyl aniline and the mixture cooled to 3° with 80 g. of ice. Subsequently 6.9 g. of sodium nitrite are added at once and the reaction mixture stirred in the dark for ten minutes. The diazonium salt solution which has been filtered through highly purified diatomaceous earth, is then added to a solution of 9.4 g. of phenol, 15 g. of a 30 percent sodium hydroxide solution and 25 g. of sodium carbonate in 200 cc. of water at 3–8° within half an hour while stirring well. After stirring for one hour the resulting azo compound is filtered off, suspended in 3000 cc. of water and filtered off once more. The compound, which is still moist, is taken up in 500 cc. of ether, washed three times with 50 cc. of a saturated sodium chloride solution and dried over magnesium sulfate. The ethereal solution is subsequently concentrated until crystallization commences and pentane is then added. The p-trifluoromethyl-p'-hydroxy-azobenzene crystallizing from ether/pentane melts at 130–132°.

(b) p-Trifluoromethyl-p'-acetoxy-azobenzene.—10.0 g. of p-trifluoromethyl-p'-hydroxy-azobenzene are dissolved in 20 cc. of acetanhydride, 0.16 cc. of concentrated sulfuric acid are added to the solution and the mixture heated to 100° for two hours. The hot solution is then poured into ice water while stirring and the resulting precipitate filtered off. This is then dissolved in 100 cc. of ether, the ethereal solution washed until neutral with a saturated sodium chloride solution and dried over magnesium sulfate. After considerable concentration pentane is added to the ethereal solution whereupon the p-trifluoromethyl-p'-acetoxy-azobenzene crystallizes. Melting point 148–149°.

(c) p - Trifluoromethyl - p'-acetoxy-hydrazobenzene.— A solution of 9.3 g. of p-trifluoromethyl-p'-acetoxy-azobenzene in 100 cc. of ethyl acetate is hydrogenated with 100 mg. of palladium/charcoal (10%) at normal pressure. After the reduction has been completed the solution is filtered off from the catalyst and concentrated at a pressure of 12 mm. of Hg. The oily residue is dissolved in a little ether and pentane is added to the solution whereupon p-trifluoromethyl-p'-acetoxy-hydrazobenzene crystallizes. After recrystallizing from ether/pentane the compound melts at 89–91°.

Example 2.—1-(p-trifluoromethyl-phenyl)-2-phenyl-4-n-butyl-pyrazolidine-3,5-dione A mixture of 4.7 g. of pyridine in 15 cc. of methylene chloride and subsequently a solution of 7.6 g. of p-trifluoromethyl-hydrazobenzene in 30 cc. of methylene chloride are added dropwise to a solution of 5.9 g. of n-butyl-malonic acid dichloride (boiling point 82–84°/12 mm. Hg) in 30 cc. of methylene chloride at 0–5°. The reaction mixture is heated to the boil for two hours, then cooled to 0° and then washed with 30 cc. of ice cold 2 N hydrochloric acid as well as with 30 cc. of water. The solution which has been dried over magnesium sulfate is subsequently concentrated, the remaining oil is dissolved in a little ether and pentane is added to the solution whereupon a portion of the desired compound crystallizes. After concentration of the mother liquor at a pressure of 12 mm. of Hg the oily residue is taken up in 100 cc. of ether and the ethereal solution is shaken five times with 70 cc. of a 2 N sodium hydroxide solution. The sodium hydroxide solution extract is then acidified with a 5 N hydrochloric acid and extracted twice with 200 cc. of ether. The ethereal solution is concentrated after washing with water and drying over magnesium sulfate and the residue recrystallized from ether/pentane whereupon a further portion of the 1-(p-trifluoromethylphenyl)-2-phenyl-4-n-butyl-pyrazolidine-3,5-dione precipitates. Melting point 135–137°. The p-trifluoromethyl-hydrazobenzene used as a starting material is obtained as follows:

(a) p - Trifluoromethyl-p'-amino-azobenzene.—32.2 g. of p-trifluoromethyl aniline are added to a solution of 57.0 g. of a 30% hydrochloric acid in 200 cc. of water and the mixture cooled to 0–3° with 160 g. of ice. A solution of 13.8 g. of sodium nitrite in 30 cc. of water is subsequently poured in at once and the reaction mixture stirred for ten minutes at 0–3°. The cold diazonium salt solution which has been filtered through highly purified diatomaceous earth is subsequently added dropwise to an aqueous solution of anilinomethane-sulfonic acid (produced from formaldehyde, sodiumbisulfite and aniline) at 5–10° and the mixture stirred for fifteen hours. The precipitate is filtered off and after washing with water suspended in 1200 cc. of water while still moist. After the addition of 60 g. of a 30% sodium hydroxide solution the mixture is heated for two hours, the reaction mixture subsequently cooled to 10° and the residue filtered off. This residue is dissolved in ethyl acetate while still moist, the solution washed with a saturated sodium chloride solution and dried over magnesium sulfate. After removing the solvent in a vacuum the crystalline residue, the p - trifluoromethyl - p'-amino-azobenzene, is recrystallized from ethyl acetate/pentane. Melting point 199–202°.

(b) p-Trifluoromethyl-azobenzene.—21.4 cc. of concentrated hydrochloric acid are added to a solution of 19.0 g. of p-trifluoromethyl-p'-amino-azobenzene in 535 cc. of methanol at −5° and subsequently a solution of 5.0 g. of sodium nitrite in 19 cc. of water is added dropwise to the mixture. The diazonium salt solution is stirred for seventy-five minutes at 0° and 143 g. of 50% hypophosphorous acid are then added within half an hour. The reaction mixture is then stirred for four and one-half hours at 0° and left to stand in an ice box for fifteen hours. The separated precipitate is filtered off, taken up in 50 cc. of chloroform and washed until neutral with water. After drying the chloroform solution over magnesium sulfate and removing the solvent, the residue is sublimated in a high vacuum. The pure p-trifluoromethyl-azobenzene melts at 92–97°.

(c) p-Trifluoromethyl-hydrazobenzene.—A solution of 9.0 g. of p-trifluoromethyl-azobenzene in 90 cc. of ethyl acetate is hydrogenated with 90 mg. of palladium/charcoal (10%) at normal pressure. After the reduction has been completed the catalyst is filtered off from the solution and the solution concentrated at a pressure of 12 mm. of Hg. The oily residue is dissolved in a little ether and pentane is added to the solution whereupon the p-trifluoromethyl-hydrazobenzene crystallizes. Melting point 101–103° from ether/pentane.

Example 3. — 1-(p-trifluoromethyl-phenyl)-2-(p'-chlorophenyl)-4-n-butyl-pyrazolidine-3,5-dione A mixture of 3.2 g. of pyridine in 10 cc. of methylene chloride and subsequently a solution of 5.7 g. of p-trifluoromethyl-p'-chloro-hydrazobenzene in 20 cc. of methylene chloride are added dropwise to a solution of 3.9 g. of n-butyl malonic acid dichloride (boiling point 82–84°/12 mm. of Hg) in 20 cc. of methylene chloride at 2–5°. The reaction mixture is heated to the boil for two hours, then cooled to 0° and then washed with 20 cc. of a 2 N hydrochloric acid as well as with 30 cc. of water. The mixture is subsequently diluted with 200 cc. of methylene chloride and shaken five times with 100 cc. of an approximately 0.4 N sodium hydroxide solution. The aqueous extract is then acidified with 2 N hydrochloric acid and extracted three times with 200 cc. of ether. The extract is washed with water until neutral, dried over magnesium sulfate and evaporated to dryness in a vacuum. The residue, the 1-(p-trifluoromethyl-phenyl)-2-(p'-chlorophenyl)-4-n-butyl-pyrazolidine-3,5-dione is recrystallized from ether/pentane. Melting point 135°. The p-trifluoromethyl-p'-chloro-hydrazobenzene used as a starting material is produced as follows:

(a) p-Trifluoromethyl-p'-chloro-azobenzene. — 14.1 g. of p-nitrosochlorobenzene are dissolved in 150 cc. of glacial acetic acid by heating and 16.1 g. of p-trifluoromethyl aniline are added immediately. The reaction mixture is left to stand at room temperature for eight hours and the precipitate, the p-trifluoromethyl-p'-chloro-azobenzene is subsequently filtered off and washed with a little cold glacial acetic acid. After drying in a vacuum the compound melts at 114–115°.

(b) p-Trifluoromethyl-p'-chloro-hydrazobenzene. — A solution of 20.0 g. of p-trifluoromethyl-p'-chloro-azobenzene in 200 cc. of ethyl acetate is hydrogenated with 1.0 g. of palladium/charcoal (10%) at normal pressure. After the reduction has been completed the catalyst is filtered from the solution and the solution is then concentrated at a pressure of 12 mm. of Hg. The oily residue is dissolved in a little ether and pentane is added to the solution whereupon the p-trifluoromethyl-p'-chloro-hydrazobenzene crystallizes after cooling well. After recrystallization from ether/pentane the compound melts at 73–76°.

Example 4.—1-(p-trifluoromethyl-phenyl)-2-(p'-methoxyphenyl)-4-n-butyl-pyrazolidine-3,5-dione The desired compound is obtained from p-trifluoromethyl-p'-methoxy-hydrazobenzene and n-butyl-malonic acid dichloride in a manner analogous to that described in Example 3. After recrystallization from ether/pentane the product melts at 134–135°. The p-trifluoromethyl-p'-methoxy-hydrazobenzene used as a starting material is produced as follows:

(a) p-Trifluoromethyl-p'-methoxy-azobenzene. — 4.2 g. of dimethylsulfate are added dropwise to a solution of 8.0 g. of p-trifluoromethyl-p'-hydroxy-azobenzene (produced according to Example 1 (a)) and 1.3 g. of sodium hydroxide in 30 cc. of methanol at 10° within half an hour. The mixture is subsequently heated to the boil for two hours. After concentration at 12 mm. of Hg the residue is taken up in 50 cc. of ether and extracted twice with 200 cc. of a 5 N sodium hydroxide solution. After washing until neutral with a saturated sodium chloride solution, the solution is dried over magnesium sulfate and the solvent distilled off. The residue is dissolved in very little ethanol while hot, cooled and a little pentane added, whereupon p-trifluoromethyl-p'-methoxy-azobenzene crystallizes. After recrystallization from ethanol/pentane the compound melts at 123–124°.

(b) p - Trifluoromethyl-p'-methoxy-hydrazobenzene.— In a manner analogous to that described in Example 3(b), the desired compound is obtained from p-trifluoromethyl-p'-methoxy-azobenzene by catalytic hydrogenation. After recrystallization from ether/pentane the compound melts at 92–94°.

Example 5.—1-(p-trifluoromethyl-phenyl)-2-(p'-acetoxy-phenyl)-4-n-butyl-pyrazolidine-3,5-dione A mixture of 8.3 g. of pyridine in 25 cc. of methylene chloride and subsequently a solution of 16.1 g. of p-trifluoromethyl-p'-acetoxy-hydrazobenzene (melting point 89–91° from ether/pentane) in 50 cc. of methylene chloride are added dropwise to a solution of 10.2 g. of n-butyl-malonic acid dichloride (boiling point 82–84°/12 mm. Hg) in 50 cc. of methylene chloride at 2–5°. The reaction solution is heated to the boil for two hours, then cooled to 0° and washed with 40 cc. of ice cold 2 N hydrochloric acid and 60 cc. of water. After drying over magnesium sulfate the solution is concentrated, whereupon the oily residue partially crystallizes. After recrystallization of the crystalline portion from ether/pentane the 1 - (p - trifluoromethylphenyl)-2-(p'-acetoxy-phenyl)-4-n-butyl-pyrazolidine-3,5-dione melts at 149–151°. The production of the p-trifluoromethyl-p'-acetoxy-hydrazobenzene used as a starting material is described in Example 1(a–c).

Example 6.—1-(p-trifluoromethyl-phenyl)-2-(p'-acetylaminophenyl)-4-n-butyl-pyrazolidine-3,5-dione A mixture of 6.0 g. of pyridine in 40 cc. of methylene chloride and subsequently 11.7 g. of p-trifluoromethyl-p'-acetylamino-hydrazobenzene in 130 cc. of methylene chloride and subsequently 11.7 g. of p-trifluoromethyl-p'-butyl-malonic acid dichloride (boiling point 82–84°/12 mm. of Hg) in 40 cc. of methylene chloride at 0–4°. The reaction solution is heated to the boil for two hours, cooled to 0° and shaken five times with 200 cc. of water. After drying over magnesium sulfate the solvent is distilled off and the oily residue is chromatographed on aluminum oxide. The 1-(p-trifluoromethylphenyl)-2-(p'-acetylamino-phenyl) - 4 - n - butyl-pyrazolidine-3,5-dione eluted with chloroform/methanol (5%) melts at 192–

197° after recrystallization from chloroform/pentane. The p - trifluoromethyl-p′-acetylamino - hydrazobenzene used as a starting material is produced as follows:

(a) p-Trifluoromethyl-p′-acetylamino - azobenzene.—10 cc. of acetic anhydride are added dropwise to a solution of 5.3 g. of p-trifluoromethyl-p′-amino-azobenzene (produced according to Example 2(a)) in 50 cc. of pyridine at room temperature and the mixture is then heated at reflux for two and one-half hours. The reaction solution is subsequently completely evaporated at a pressure of 12 mm. of Hg and the residue taken up in 100 cc. of ether. The ethereal solution is shaken twice with 20 cc. of 2 N hydrochloric acid, and twice with 20 cc. of a 1 N potassium carbonate solution, washed until neutral with a saturated sodium chloride solution and dried over magnesium sulfate. After removal of the solvent the residue is dissolved in a little ethyl acetate, pentane added and the mixture cooled, whereupon the p-trifluoromethyl-p′-acetylamino-azobenzene crystallizes. After recrystallization from ethyl acetate/pentane the compound melts at 235–236°.

(b) p - Trifluoromethyl - p′ - acetylamino-hydrazobenzene.—A solution of 10.0 g. of p-trifluoromethyl-p′-acetyl-amino-azobenzene in 100 cc. of ethyl acetate is hydrogenated with 500 mg. of palladium/charcoal (10%) at normal pressure. After the reduction has been completed the catalyst is filtered off from the solution and the solution concentrated at a pressure of 12 mm. of Hg. The oily residue is dissolved in a little ether and pentane added to the solution, whereupon the p-trifluoromethyl-p′-acetylamino-hydrazobenzene crystallizes. Melting point 160–163°.

Example 7.—1,2-di-(p-trifluoromethyl-phenyl)-4-n-butyl pyrazolidine-3,5-dione

A mixture of 1.6 g. of pyridine and 5 cc. of methylene chloride are added to a solution of 2 g. of n-butyl-malonic acid dichloride (boiling point 82–84°/12 mm. Hg) in 10 cc. of methylene chloride at 0 to 5° and subsequently a solution of 3.2 g. of p,p′-trifluoromethyl-hydrazobenzene (melting point 118–121°) in 10 cc. of methylene chloride are added dropwise. The reaction solution is heated to the boil for two hours, then cooled to 0° and washed with 8 cc. of a 2 N hydrochloric acid as well as with 5 cc. of water. The solution dried over magnesium sulfate is concentrated, the oily residue taken up in 50 cc. of ether and shaken five times, each time with 10 cc. of a cold 1 N sodium hydroxide solution. The sodium hydroxide extract is washed with 10 cc. of ether, then acidified with a 2 N hydrochloric acid and extracted with 200 cc. of ether. After washing with water and drying over magnesium sulfate the ether extract is concentrated and the crystalline residue recrystallized from ether/pentane. The pure compound melts at 168–169°. The p,p′-trifluoromethyl-hydrazobenzene used as a starting material is prepared as follows:

(a) p,p′-Trifluoromethyl-azoxybenzene.—2.7 g. of fluorenone are added to a mixture of 42.4 g. of caustic soda and 145 cc. of methanol at the boiling point. A solution of 100 g. of p-nitrobenzotrifluoride in 145 cc. of methanol are then added dropwise in the course of half an hour. The reaction mixture is heated to the boil for five hours, then cooled to 10° and the resulting crystalline precipitate filtered off. The filtrate is concentrated at a pressure of 15 mm. of Hg; the resulting oily material is combined with the crystalline precipitate and divided between 100 cc. of water and 300 cc. of chloroform. The water separated from the chloroform is shaken a further two times, each time with 100 cc. of chloroform, the combined chloroform extracts are washed with 100 cc. of water and dried over magnesium sulfate. After removal of the chloroform and recrystallization of the residue from ethanol the p,p′-trifluoromethyl-azoxybenzene melts at 106–108°.

(b) p,p′-Trifluoromethyl-hydrazobenzene.—70 g. of zinc dust are added to a boiling solution of 50 g. of p,p′-trifluoromethyl-azoxybenzene in 250 cc. of glacial acetic acid in the course of 40 minutes. The reaction mixture is then heated for one hour, filtered while hot and the filtrate evaporated to dryness at a pressure of 15 mm. of Hg. The crystalline residue is taken up in 200 cc. of chloroform, washed twice with 50 cc. of water, dried over magnesium sulfate and concentrated. The residue, the p,p′-trifluoromethyl-hydrazobenzene is then recrystallized from a 60% aqueous ethanol solution. Melting point 118–121°.

Example 8.—1,2-di-(p-trifluoromethyl-phenyl)-4-cyclohexyl-pyrazolidine-3,5-dione A mixture of 3.2 g. of pyridine and 10 cc. of methylene chloride are added dropwise to a solution of 4.5 g. of cyclohexyl malonic acid dichloride (boiling point 116–117°/13 mm. of Hg) in 10 cc. of methylene chloride at 0–4° and a solution of 6.5 g. of p,p′-trifluoromethyl-hydrazobenzene (melting point 118–121°) in 30 cc. of methylene chloride are then added dropwise. The reaction solution is heated to the boil for two hours, diluted with 30 cc. of methylene chloride and cooled to 0°. The cold solution is washed with 18 cc. of 2 N hydrochloric acid as well as with 20 cc. of water, dried over magnesium sulfate, concentrated until crystallization commences and 50 cc. of pentane are added. After recrystallization from chloroform/pentane the 1,2 - di - (p-trifluoromethyl-phenyl) - 4 - cyclohexyl-pyrazolidine-3,5-dione melts at 236–237°.

The cyclohexyl malonic acid dichloride used as a starting material is prepared from cyclohexyl malonic acid by conversion with phosphorus pentachloride. Boiling point 116–117°/13 mm. of Hg.

Example 9.—1,2-di-(p-trifluoromethyl-phenyl)-4-benzyl-pyrazolidine-3,5-dione

A mixture of 3.2 g. of pyridine and 10 cc. of methylene chloride are added dropwise to a solution of 4.6 g. of benzyl malonic acid dichloride (boiling point 109–112°/0.45 mm. of Hg) in 10 cc. of methylene chloride at 0–4° and a solution of 6.5 g. of p,p′-trifluoromethyl-hydrazobenzene in 30 cc. of methylene chloride are then added dropwise. The reaction solution is heated to the boil for two hours, then diluted with 30 cc. of methylene chloride and cooled to 0°. The cold solution is washed with 18 cc. of 2 N hydrochloric acid, as well as with 20 cc. of water, dried over magnesium sulfate and concentrated. The residue is taken up in 100 cc. of ether and shaken five times, each time with 20 cc. of a cold 1 N sodium hydroxide solution. The sodium hydroxide extract is washed with 20 cc. of ether, then acidified with a 2 N hydrochloric acid and extracted with 300 cc. of ether. After washing with water and drying over magnesium sulfate the ethereal extract is concentrated until crystallization commences and 50 cc. of pentane are then added. After recrystallization from ether/pentane the 1,2-di-(p-trifluoromethyl-phenyl)-4-benzyl-pyrazolidine-3,5-dione melts at 181–183°.

Example 10.—1,2-di-(p-trifluoromethyl-phenyl)-4-sec.amyl-pyrazolidine-3,5-dione

A mixture of 6.3 g. of pyridine and 20 cc. of methylene chloride and subsequently a solution of 12.8 g. of p,p′-trifluoromethyl-hydrazobenzene in 60 cc. of methylene chloride are added dropwise at −5° to 0° to a solution of 8.4 g. of sec.amylmalonic acid dichloride (boiling point 81–86°/15 mm. of Hg, produced from sec.amylmalonic acid and phosphorus pentachloride). The reaction solution is stirred for eighteen hours at room temperature, diluted with 50 cc. of methylene chloride and shaken with 50 cc. of water. Subsequently the solution is extracted with 40 cc. of 2 N hydrochloric acid, washed until neutral with water, dried over magnesium sulfate and evaporated to dryness. The crystalline residue, the 1,2-di-(p-trifluoromethyl-phenyl)-4-sec.amylpyrazolidine-3,5-dione, is recrystallized from ethanol. Melting point 150–151°.

What is claimed is:
1. A compound selected from the group consisting of hydrazobenzenes of the formula:

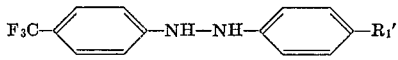

wherein $R_1'$ is a member selected from the group consisting of hydrogen, halogen, methoxy, acetoxy and acetylamino.

2. p-Trifluoromethyl-p'-acetoxy-hydrazobenzene.
3. p-Trifluoromethyl-hydrazobenzene.
4. p-Trifluoromethyl-p'-chloro-hydrazobenzene.
5. p-Trifluoromethyl-p'-methoxy-hydrazobenzene.
6. p-Trifluoromethyl-p'-acetylamino-hydrazobenzene.

References Cited

UNITED STATES PATENTS 2,173,386  9/1939  Vivian _____ 260—569
3,257,403  6/1966  Pfister et al. _____ 260—479

OTHER REFERENCES

Chem. Abstracts, vol. 52, p. 1085h (1958).
Chem. Abstracts, vol. 48, p. 10636g (1954), citing Cartwright et al.

LORRAINE A. WEINBERGER, *Primary Examiner.*

M. G. BERGER, *Assistant Examiner.*

U.S. Cl. X.R.

260—205, 206, 207.1, 310, 562, 569; 424—320